US011194606B2

(12) United States Patent
Tsirkin

(10) Patent No.: US 11,194,606 B2
(45) Date of Patent: Dec. 7, 2021

(54) MANAGING RELATED DEVICES FOR VIRTUAL MACHINES UTILIZING SHARED DEVICE DATA

(71) Applicant: Red Hat, Inc., Raleigh, NC (US)

(72) Inventor: Michael Tsirkin, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 42 days.

(21) Appl. No.: 16/203,079

(22) Filed: Nov. 28, 2018

(65) Prior Publication Data

US 2020/0167181 A1 May 28, 2020

(51) Int. Cl.
| | |
|---|---|
| *G06F 9/455* | (2018.01) |
| *G06F 13/10* | (2006.01) |
| *G06F 11/14* | (2006.01) |
| *G06F 11/20* | (2006.01) |
| *G06F 9/48* | (2006.01) |
| *G06F 13/42* | (2006.01) |
| *G06F 13/40* | (2006.01) |

(52) U.S. Cl.
CPC ...... *G06F 9/45558* (2013.01); *G06F 9/45545* (2013.01); *G06F 9/4856* (2013.01); *G06F 11/1484* (2013.01); *G06F 11/203* (2013.01); *G06F 13/105* (2013.01); *G06F 13/4027* (2013.01); *G06F 13/4221* (2013.01); *G06F 2009/4557* (2013.01); *G06F 2009/45579* (2013.01); *G06F 2201/815* (2013.01)

(58) Field of Classification Search
CPC .............. G06F 9/45558; G06F 13/105; G06F 11/1484; G06F 11/203; G06F 9/4856; G06F 13/4221; G06F 13/4027; G06F 9/45545; G06F 2201/815; G06F 2009/45579; G06F 2009/4557; G06F 11/2038; G06F 9/4411
See application file for complete search history.

(56) References Cited

U.S. PATENT DOCUMENTS

| | | | |
|---|---|---|---|
| 7,478,178 B2 | 1/2009 | Torudbakken et al. | |
| 7,743,389 B2 | 6/2010 | Mahalingam et al. | |
| 7,945,436 B2 * | 5/2011 | Ang | G06F 9/45558 |
| | | | 703/23 |
| 8,583,848 B2 * | 11/2013 | Miyoshi | G06F 13/102 |
| | | | 710/313 |
| 8,843,689 B2 * | 9/2014 | Engebretsen | G06F 9/4411 |
| | | | 710/316 |
| 8,913,620 B2 * | 12/2014 | Basso | H04L 45/16 |
| | | | 370/396 |
| 9,134,911 B2 * | 9/2015 | Craddock | G06F 9/4411 |
| 9,195,495 B2 | 11/2015 | Sahota et al. | |
| 9,197,539 B2 * | 11/2015 | Cors | H04L 12/1886 |
| 9,268,593 B2 * | 2/2016 | Suzuki | G06F 9/45558 |
| 9,720,712 B2 * | 8/2017 | Tsirkin | G06F 9/4868 |
| 9,858,102 B2 * | 1/2018 | Khemani | G06F 11/3409 |

(Continued)

*Primary Examiner* — Matthew J Brophy
(74) *Attorney, Agent, or Firm* — Lowenstein Sandler LLP

(57) ABSTRACT

Aspects of the disclosure provide for mechanisms for managing related devices for virtual machines in a computer system. A method of the disclosure includes: associating, by a processing device executing a hypervisor, hypervisor data with a first bridge device; attaching a first device associated with a virtual machine to the first bridge device; identifying a second device related to the first device; associating, by the processing device, the hypervisor data with the second device. In some embodiments, the second device is a failover device of the first device.

18 Claims, 10 Drawing Sheets

(56) References Cited

U.S. PATENT DOCUMENTS

| | | | |
|---|---|---|---|
| 10,042,723 B2 * | 8/2018 | Arroyo | G06F 11/2007 |
| 10,671,423 B2 * | 6/2020 | He | G06F 9/45508 |
| 2009/0119087 A1 * | 5/2009 | Ang | G06F 9/45558 |
| | | | 703/23 |
| 2009/0119684 A1 * | 5/2009 | Mahalingam | G06F 9/45558 |
| | | | 719/324 |
| 2009/0276544 A1 * | 11/2009 | Arndt | G06F 13/387 |
| | | | 710/3 |
| 2012/0102217 A1 * | 4/2012 | Cardona | G06F 9/45558 |
| | | | 709/235 |
| 2012/0201253 A1 * | 8/2012 | Cardona | G06F 9/45558 |
| | | | 370/401 |
| 2014/0181810 A1 * | 6/2014 | Lvovsky | G06F 9/44505 |
| | | | 718/1 |
| 2014/0337500 A1 * | 11/2014 | Lee | H04L 67/10 |
| | | | 709/223 |
| 2014/0344811 A1 * | 11/2014 | Suzuki | G06F 9/544 |
| | | | 718/1 |
| 2014/0359613 A1 * | 12/2014 | Tsirkin | G06F 9/4856 |
| | | | 718/1 |
| 2016/0342437 A1 * | 11/2016 | Khemani | H04L 43/0811 |
| 2017/0147370 A1 * | 5/2017 | Williamson | G06F 9/45558 |
| 2017/0242763 A1 * | 8/2017 | Arroyo | G06F 9/45558 |
| 2018/0276024 A1 * | 9/2018 | He | G06F 9/45508 |
| 2018/0293143 A1 * | 10/2018 | Arroyo | G06F 9/45558 |
| 2020/0167247 A1 * | 5/2020 | Tsirkin | G06F 11/1484 |

\* cited by examiner

MANAGING RELATED DEVICES FOR VIRTUAL MACHINES UTILIZING SHARED DEVICE DATA

TECHNICAL FIELD

The implementations of the disclosure generally relate to computer systems and, more specifically, to managing related devices (a primary device and a failover device) for virtual machines.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). An executable layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer. A host machine can accommodate more virtual machines than the size of its physical memory allows. Using virtual memory techniques, the host machine can give each virtual machine the impression that it has a contiguous address space, while in fact the memory used by the virtual machine may be physically fragmented and even overflow to disk storage.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
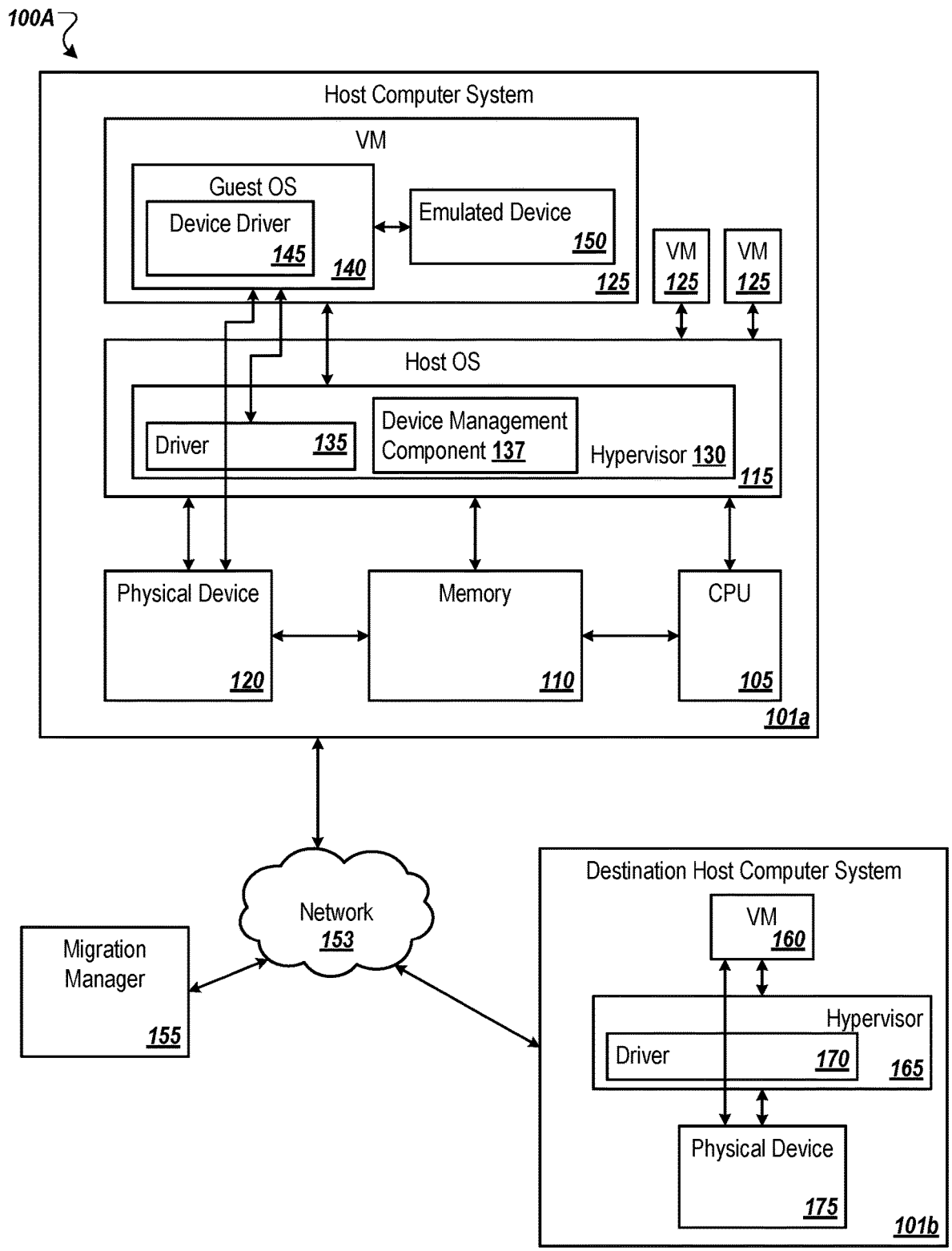
FIGS. 1A and 1B are a block diagram of a network architecture in which implementations of the disclosure may operate.

The present disclosure pertains to managing related devices for a virtual machine. A host computer system ("host") provides computing resources (e.g., processing power, memory, storage, input output (I/O) interfaces, devices, etc.) to a virtual machine (VM). The host computer system can use a hypervisor to control the VM's use of the computing resources. The hypervisor can expose devices of the host to the VM. Exposing devices of the host may involve making devices of the host available for use by the VM. Devices of the host can include, for example, storage devices, network devices, graphics devices, system components (e.g., bridges, ports, buses) media devices, (e.g., video cards, sounds cards), etc.

For example, the hypervisor can expose devices of the host to a VM via emulated devices or passthrough devices. Emulated devices are virtual devices within a VM that mimic physical (hardware) devices, allowing guest operating systems to work with the emulated devices using standard in-box drivers. Some emulated devices may be paravirtualized devices. In some embodiments, the guest operating system does not include drivers for the paravirtualized devices. The hypervisor can cause the guest operating system to install these drivers automatically. A passthrough device of a VM is the host's device that can be used by the VM exclusively as set by the hypervisor. Device assignment allows the virtual machine to access the host's device directly or via a hypervisor for a range of tasks, and it allows the virtual machine to perceive the passthrough device as if it was attached to the guest operating system. The hypervisor can act as a passthrough for communications between the VM and the host device. Alternatively, the hypervisor can permit the VM to directly communicate with the host device without going through the hypervisor. In a hybrid approach, the hypervisor can act as a passthrough for some communications between the VM and the host device while for other communications, the hypervisor is not involved and the VM communicates with the host device directly. To mitigate any undesirable effects that may occur as a result of a device or operation failure, conventional systems permit multiple physical devices to be configured as a pair in a failover relationship. When one device (e.g., a primary device) experiences an error, for example, operations for that device can be moved (or failed over) to the other device (e.g., a failover device). The device roles then can switch—the failover device becomes the primary device and the primary device becomes the failover device.

The different types of devices (emulated or passthrough devices) can enable different features or configurations for a VM. In particular, resource overcommit can be available for one device type and not for another. Resource overcommit can include allocating more virtualized CPUs or memory to a VM than there are physical resources on the host computer system. In memory overcommit, virtual address space allocated to a VM exceeds the available physical address space in a host computer system. Because passthrough devices involve static memory allocation, resource overcommit may not be available for passthrough devices. Similarly, some device types can be used in conjunction with VM migration while others cannot. For example, emulated devices can be used during VM migration while passthrough devices cannot because they are not part of the VM being migrated. In contrast, passthrough devices can be used to increase performance of the VM.

To enable switches between a passthrough device and an emulated device, existing virtualization techniques may use a failover driver to implement device failover. For example, the failover driver may attempt to send any request first to a passthrough device. If the failover driver detects a failure related to the first device, the failover driver may then send the request to an emulated device (e.g., a paravirtualized device). However, as described above, the passthrough device and the emulated device may require separate drivers to operate. While a hypervisor may modify the interface of the emulated device, the hypervisor may not be able to modify the passthrough device. As a result, the hypervisor may need to implement a paravirtual interface to bind the passthrough device and the emulated device to the same failover driver. For example, the existing virtualization techniques may implement a paravirtual bus in additional to a native Peripheral Component Interconnect (PCI) bus to implement device failover. This may require modifications of an operating system of the virtual machine. The existing virtualization techniques do not provide a solution for passing data about the passthrough device via a native PCI bus for switching between the passthrough device and the emulated device.

Aspects of the present disclosure address the above and other deficiencies by providing mechanisms for managing related devices of a virtual machine using shared device data. For example, the mechanisms disclosure herein may manage devices in a failover relationship and other related devices for the virtual machine. For example, the mechanisms can identify a first device and a second device as being related to each other. The first device may be a primary device assigned to the virtual machine while the second device may be a failover device. In some embodiments, the first device and the second device may be passthrough device and an emulated device (e.g., a paravirtualized device), respectively. The mechanisms disclosure herein may associate the first device and the second device with the same device data (e.g., hypervisor data that may include a serial number, a device identification (ID), a vendor ID, etc.). For example, the mechanisms may associate certain hypervisor data (e.g., hypervisor data specific to a hypervisor) with a first bridge device and may attach the first device to the first bridge device. The mechanisms may also associate the hypervisor data with the second device. In one implementation, the mechanisms may associate the hypervisor data with the second device by setting values of one or more registers of the second device to values corresponding to the device data. In another implementation, the mechanisms may associate the hypervisor data with a second bridge device and may attach the second device to the second bridge device. In some embodiments, the first bridge device and the second bridge device may be a first PCI bridge and a second bridge, respectively. As such, the association of the same hypervisor data with the first device and the second device may indicate that the first device and the second device are related devices of the virtual machine. The hypervisor data may be associated with a given bridge device by configuring one or more registers of the bridge device (e.g., a configuration space of the given bridge device).

In some embodiments, upon detecting a failover event related to the first device, the mechanisms may identify the second device as the failover device of the first device in view of the association of the hypervisor data with the first device and the second device. For example, the mechanisms may determine that the first device is attached to the first bridge device that is associated with the hypervisor data. The mechanisms may also determine that the second device is associated with the hypervisor data. For example, the mechanisms may determine that the values of the registers of the second device correspond to the hypervisor data. As another example, the mechanisms may determine that the second device is attached to the second bridge device and that the second bridge device is associated with the hypervisor data. As such, the mechanism disclosure herein may identify related devices of a virtual machine in view of the hypervisor data associated with the devices.

The systems and methods described herein include technology that enhances virtualization technology for a computer system. The technology may enable enhanced device management for virtual machines by matching related devices in view of hypervisor data associated with bridge devices attached to the related devices. Compared to conventional virtualization techniques, the mechanisms disclosed herein may implement device failover utilizing a native PCI bus. This may allow the mechanisms to enable efficient device failover without modifying an existing operating system of the virtual machine.

For brevity, simplicity and by way of example, a hypervisor performs many of the operations described herein. It is contemplated that other actors may perform some or all of the operations described herein, including a host operating system, multiple hypervisors, a migration manager, and the like, including a combination thereof. Further, described herein are techniques for switching between a primary device and a failover device. While examples described herein describe switching between a passthrough device and an emulated device, switching between any device, types of devices or between devices of the same type is contemplated.

FIG. 1A is a block diagram that illustrates an example computing system architecture 100A in which embodiments may operate. The computing system 100A may include a host computer system 101 that hosts one or more virtual machines (VM) 125. Each VM 125 runs a guest operating system (OS) 140. The VMs 125 may have the same or different guest operating systems 140, such as Microsoft Windows®, Linux®, Solaris®, Mac® OS, etc. The host computer system 101 may be a server, a workstation, a personal computer (PC), a mobile phone, a palm-sized computing device, a personal digital assistant (PDA), etc.

The host computer system 101 may run a hypervisor 130 to virtualize access to the underlying host hardware, making the use of the VM 125 transparent to the guest OS 140 and a user of the host computer system 101. The hypervisor 130 may also be known as a virtual machine monitor (VMM) or a kernel-based hypervisor. The hypervisor 130 may be part of a host OS 115, run on top of the host OS 115, or run directly on the host hardware without an operating system beneath it.

The host computer system 101 may include hardware components such as one or more physical central processing units (CPUs) 105, memory 110 (also referred to as "host memory" or "physical memory") and other hardware components. In one implementation, the host computer system 101 includes one or more physical devices 120 (also referred to as "physical devices," or "host devices"), such as audio/video devices, network interface devices, printers, graphics modules, etc. For simplicity of the illustration, one physical device 120 is shown. It is understood that the host computer system 101 may include any number of physical devices. The physical device 120 can be any type of device, including a data storage device or mass storage device, such as a magnetic or optical storage based disk, tape or hard drive. Other examples of physical devices 120 include network devices, graphics devices, system components (e.g., bridges, ports, buses) media devices, (e.g., video cards, sounds cards, etc.).

The hypervisor 130 can assign a physical device 120 to a VM 125 and can expose the physical device 120 to a guest OS of the VM 125 as port of the VM 125. The passthrough device is also referred to as a passthrough device. The assignment of the passthrough device to the VM 125 may enable the guest OS of the VM 125 to have direct access to the physical device 120. In some embodiments, when the physical device 120 is assigned to the VM 125, the physical device 120 cannot be assigned to another VM. In some embodiments, migration of the VM 125 and/or memory overcommitment of the VM 125 may be disabled when the physical device 120 is assigned to the VM 125.

The hypervisor 130 can request that the guest OS 140 use the passthrough device. The hypervisor 130 can give the guest OS 140 direct access to the passthrough device (physical device 120) such that communications between the guest OS 140 and the passthrough device 120 are not routed through the hypervisor 130. In other implementations, communications between the guest OS 140 and the passthrough device 120 can pass through the hypervisor 130 and the hypervisor 130 redirects the communications between the passthrough device 120 and the guest OS 140 without modifying these modifications (e.g., passthrough). To directly access the passthrough device 120, the guest OS 140 may have a driver 145 that is specific to the device 120.

In some embodiments, when the hypervisor 130 assigns a device to the VM 125, the hypervisor 130 can also indicate that the passthrough device needs a companion device for failover. The companion device can be a device that is emulated by the VM 125 (e.g., emulated device 150). The emulated device 150 may use the physical device 120 or any other suitable physical device as a backend. The emulated device 150 may be a device implemented by the hypervisor 130 and may be exposed to the guest OS 140 as part of the VM 125. The emulated device may be a virtual device that mimics real hardware and may be implemented using full emulation. In some embodiments, the emulated device 150 may be a paravirtualized device implemented using paravirtualization. In such implementation, the device driver associated with the emulated device 150 does not work on the hardware of the host computer system 101a.

The hypervisor 130 can define the failover relationship between the passthrough device and the emulated device 150 and can provide a notification to the guest OS 140 that the two devices are available for a failover relationship. In some embodiments, the hypervisor 130 can transmit to the guest OS 140 a request indicating a failover event. The failover event can involve or trigger a switch from the passthrough device to the emulated device 150. The request can be, for example, a hot unplug request, operation failure report, or terminate request. The hypervisor 130 can leverage the failover relationship to enable desired features (e.g., migration capability or resource overcommit capability) to the VM and/or to regulate performance of the VM. The guest OS 140 receives the request and transmits an acknowledge message to the hypervisor 130 to initiate a failover. Once the hypervisor 130 receives the acknowledge message from the guest OS 140, the hypervisor 130 can prevent guest OS 140 from accessing the passthrough device (e.g., protect the passthrough device from guest OS 140 access). To prevent the guest OS 140 from accessing the passthrough device, the hypervisor 130 can update a data structure, such as a page table or an internal hypervisor data structure, with instructions to forward requests intended for the passthrough device to the emulated device 150.

Before the guest OS 140 can switch to the emulated device 150, the hypervisor configures the emulated device 150 for use. To configure the emulated device 150, the hypervisor 130 can start or associate a driver 135 in the hypervisor that is specific to the physical device 120. The hypervisor 130 can then expose the emulated device 150 to the guest OS 140. The guest OS 140 can access the emulated device 150 using a generic driver 145 (e.g., a driver that is not specific to the physical device) because the specific driver is handled by the hypervisor 130. Once the emulated device 150 is configured, the hypervisor 130 can provide a notification to the guest OS 140 that the emulated device 150 is available for use. The guest OS 140 can then use the emulated device 150 for regular functionality or special functionality, such as for resource overcommit, migration, and the like. In one implementation, the guest OS 140 has a smart driver 145 that switches between emulated and passthrough devices, such as for a failover operation. If the hypervisor 130 identifies an access request or message addressed to the emulated device during the switch (before the switch is completed), the hypervisor 130 can hold the access request or message. Upon receiving a notification that the guest OS 140 is ready to use the emulated device 150, the hypervisor 130 can transmit the access request or message to the emulated device 150. When the guest OS 140 communicates with the emulated device 150 (e.g., to write data to, or read data from the emulated device 150), the hypervisor 130 detects these communications and propagates them to the physical device 120.

To switch from the emulated device 150 to passthrough device, the hypervisor 130 can take actions similar to those taken when switching from the passthrough device to the emulated device 150. The hypervisor 130 can transmit a switch-back request to the VM. The switch-back request can be in any form, such as a request to unplug the emulated device 150 (e.g., such as when migration is complete), virtual device failure report, or terminate request (e.g., terminate overcommit), etc. The hypervisor 130 can disassociate the device driver 135 in the hypervisor 130 from the backend physical device 120. The hypervisor 130 can expose the passthrough device to the guest OS. The hypervisor can also update a data structure, such as a page table or an internal hypervisor data structure, with instructions to forward requests intended for the emulated device 150 to the passthrough device. The hypervisor 130 can then provide a request to the guest OS 140 to switch to the passthrough device. The guest OS 140 can have a driver 145 that is specific to the physical device 120.

In some implementations, hypervisor 130 (e.g., in response to a system administrator request) can initiate a resource overcommit for the VM 125. To facilitate the resource overcommit, the hypervisor 130 can instruct the guest OS 140 to "failover" or switch from the passthrough device to the emulated device 150, as described herein. When overcommit is no longer desired, the hypervisor 130 can instruct the guest OS 140 to failover or switch back to the passthrough device. In one example, resource overcommit is enabled for execution of a specific program. The hypervisor 130 determines or identifies when the program execution is complete and initiates the switch back to the passthrough device.

In another implementation, the hypervisor can initiate the switch in response to a VM migration request. The request can come from a migration manager 155, system administrator, etc. For VM migration, the VM 125 switches to the emulated device 150 using techniques described herein. The VM migration can be to another VM on the same host computer system 101a or to another host computer system 101b (e.g., a destination host computer system), such as over a network 153. When the VM migration is complete, the hypervisor (on the same host 101a or the destination host 101b) may instruct the guest OS of the migrated VM to switch to a passthrough device (physical device 120 on the same host 101a or physical device 180 on the destination host 101b). In one implementation, the physical device 180 of the destination host 101b is the same make and model device as physical device 120 of the source computer system 101a. In another implementation, the physical device 120 and the physical device 180 are not the same make and/or model but perform a similar function (e.g., video card, storage device, etc.). When switching from the emulated device 150 to the passthrough device 175, the hypervisor 165 can install a driver that is specific for the physical device 180.

In one implementation, the request to switch is a hot unplug request or a terminate request. In another implementation, the request is an operation failure report. For example, if the passthrough device and emulated device 150 are networking devices, an operation failure report can indicate that a networking link is broken. To try another link that might work, the guest OS 140 can switch to the emulated device 150. The operation failure report can be for any type of failure for any type of device, such as a read or write error for a storage device, and the like.

As illustrated, the hypervisor 130 may include a device management component 137 that can manage devices for one or more VMs 125. For example, the device management component 137 may manage devices in a failover relationship and other related devices for a VM 125. In some embodiments, the device management component 137 may associate the related devices with the same device data. For example, the device management component 137 can identify a first device and a second device as being related to each other. The first device may be a primary device assigned to the VM 125 while the second device may be a failover device. In some embodiments, the first device and the second device may be a passthrough device and an emulated device, respectively. The device management component 137 may associate the first device and the second device with the same device data (e.g., hypervisor data specific to the hypervisor 130) to indicate that the first device and the second device are related devices. For example, the device management component 137 may associate hypervisor data (e.g., a serial number, a device identification (ID), a vendor ID, etc.) with a first bridge device and may attach the first device to the first bridge device. The device management component 137 may also associate the hypervisor data with the second device (e.g., a paravirtualized device). For example, the device management component 137 may associate the hypervisor data with the second device by configuring one or more registers of the second device. As another example, the device management component 137 may associate the hypervisor data with a second bridge device and can attach the second device to the second bridge device. Each of the first bridge device and the second bridge device may be and/or include a bridge 185 of FIG. 1B. In some embodiments, the device management component 137 may associate the hypervisor data with a given bridge device by setting values of one or more registers of the given bridge device (e.g., one or more fields of a PCI configuration of the given bridge device) to values corresponding to the hypervisor data.

In some embodiments, upon detecting a failover event related to the first device assigned to a VM 125, the device management component 137 may identify the second device as the failover device of the first device in view of the association of the hypervisor data with the first device and the second device. For example, the device management component 137 can determine that the first bridge device is associated with the hypervisor data. The device management component 137 may identify the second device as a failover device of the first device by determining that the second device is associated with the hypervisor data. In one implementation, the device management component 137 may determine that the second device is associated with the hypervisor data by determining that the values of the registers of the second device correspond to the hypervisor data. In another implementation, the device management component 137 may determine that the second device is associated with the hypervisor data by determining that the second bridge device is also associated with the hypervisor data and that the second device is attached to the second bridge device. As such, the device management component 137 may identify a failover device in view of the hypervisor data associated with the related devices.

In some embodiments, the device management component 137 include one or more components as described in connection with FIG. 2 and may perform various operations discussed herein with reference to FIGS. 3-8.

Figure 1B:
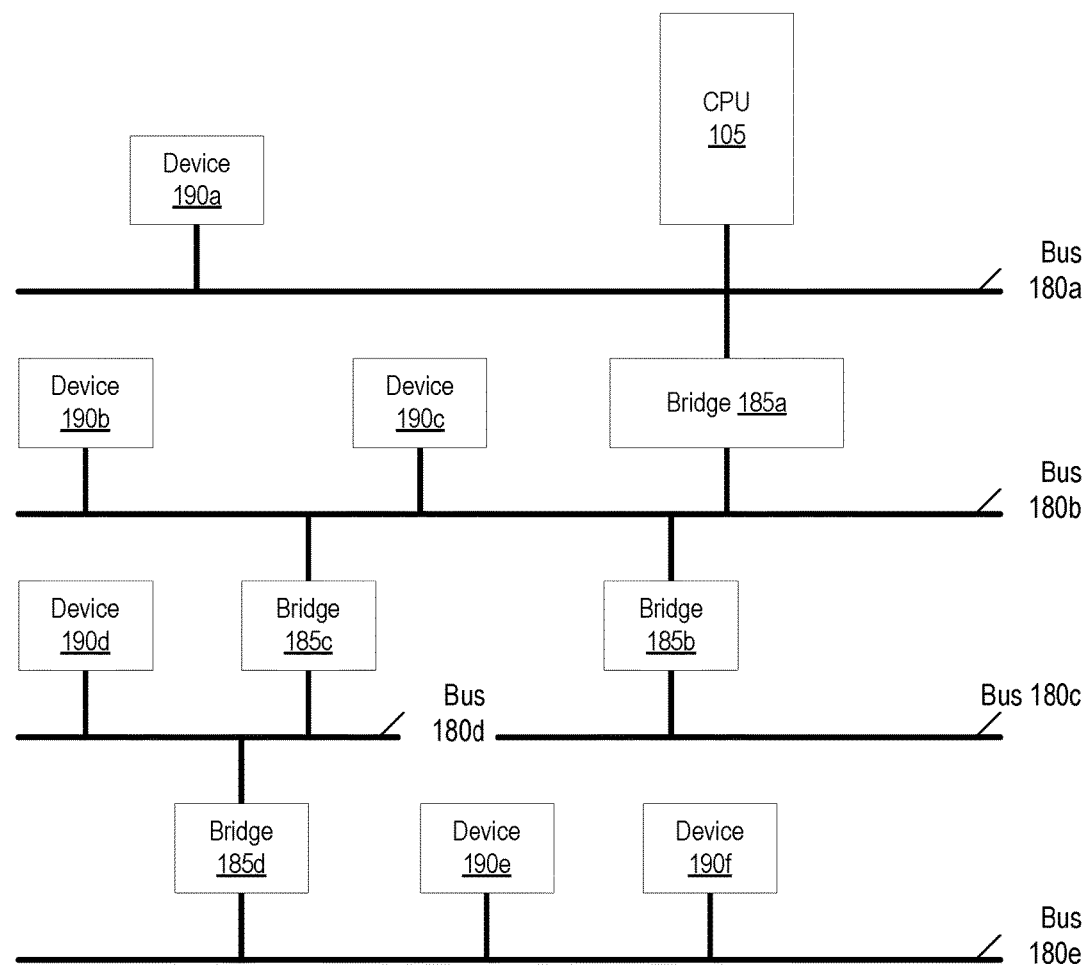

FIG. 1B illustrates example computing system architecture 100B in which embodiments may operate. The computing system architecture 100B may be of a server, a workstation, a personal computer (PC), a virtual machine, a mobile device, tablet, laptop computer, thin client, etc. The computing system architecture 100B may include a processing device (e.g., CPU) 105, a plurality of buses 180a-d, one or more devices 190a-f, and one or more bridges 185a-d. Computing system architecture 100B may include more or fewer CPUs, buses, devices and bridges. Each of devices 190 may be a physical device 120 or an emulated device 150 as described in connection with FIG. IA.

CPU 105 can refer to one or many processing devices and each CPU 105 can have one or more cores. CPU 105 can assign one or more identifiers (e.g., addresses, address ranges, device numbers, slot numbers, bus numbers, subordinate bus numbers) to buses 180, devices 190, and bridges 185 within a computing system. As the terms is used herein, address can be interpreted to include a plurality of addresses, an address range, a range of addresses, etc. CPU 105 can store assigned address and identifiers in a system list. CPU 105 can perform certain operations to communicate with devices 190. These operations can be part of transactions which can include, for example, an initialization transaction and a memory transaction. An initialization transaction can be used during system or device initialization (e.g., when a device is connected to the system after the system has been initialized and/or setup), and can include, for example, probing for available devices, assigning bus numbers, and allocating addresses to devices 190. A memory transaction can include an operation to access a device 190 and a response from the device 190. A Basic Input/Output System (BIOS), or an operating system for example, can use CPU 105 to perform the above operations and transactions.

Buses 180a-d can function as a connection or communication path between computer components and devices. Buses 180 can be identified by bus numbers that can be tracked in the system list. For example, bus 180a can be identified as "Bus 1" while bus 180b can be identified as "Bus 2." A bus can, for example, connect CPU 105 to memory. A bus that is directly connected to CPU 105 is typically referred to as a system or local bus. Other examples of buses include parallel and serial buses, both internal and external, such as a Peripheral Component Interconnect (PCI) bus, a Universal Serial Bus (USB), HyperTransport, Serial ATA, InfiniB and, etc. A bus 180 can have slots for connecting devices 190 to the bus 180.

Device 190 can communicate with other components (e.g., CPU 105, memory, other devices 190) via bus 180 and can be connected to slots on bus 180. Device 190 can be added to the computing system 100A at any time, including after the bridge is powered on and is in an active state (e.g., after the bridge has left the reset state). When a device 190 is connected to the computing system 100A, it can receive an initialization message and send a response to the initialization message that includes a requested size of an address range for the device 190. Device 190 can be any hardware, or virtualized hardware, that can be connected to a computing system. Examples of devices include but are not limited to: video cards, controllers, sound cards, network interface cards, peripheral devices (e.g., keyboard, mouse, touch screen, remote control, camera), etc. Device 190 can be identified by an address, as described below. In an example, bus 180 is a PCI bus. Devices connected to a PCI bus appear to the CPU to be connected directly to the system bus, and are assigned addresses in the CPU's address space. Example devices that typically use PCI connections include: video cards, network cards, extra ports (e.g., USB), sound cards, TV tuners, disk controllers (e.g., RAID), etc.

Bridge 185 can function as a connection between buses 180. The bus 180 on the side of the bridge that is closer to the CPU 105 can be referred to as a primary or upstream bus, while the bus on the side of the bridge that is further from the CPU 105 can be referred to as a secondary or downstream bus. Bridge 185a, for example, connects bus 180a to bus 180b and functions as a communication path between the two buses. With respect to bridge 185a, bus 180a is the primary or upstream bus and bus 180b is the secondary or downstream bus. A bridge can allow operations or transactions to occur between an upstream bus and a downstream bus. Bridges can also increase the number of devices within a system because buses 180 typically support a finite number of connected devices 190. Examples of bridges include a PCI bridge, a PCI-to-PCI bridge, PCI Express (PCIe) bridge, etc. Bridges can be identified by a bridge number. Bridges can also be identified by the buses to which they are connected, which includes a primary bus, a secondary bus and a subordinate bus, which is the most remote bus of all the buses that can be reached downstream of the bridge. For example, bridge 185a can be identified by identifying primary bus 180a, secondary bus 180b and subordinate bus 180e.

When initializing a computing system, the CPU 105 can use an initialization probe to scan buses 180 for available devices 190 and bridges 185. The initialization probe can include a "HELLO" message to the detected device (e.g., device 190a). The device 190 can respond to the probe with a response that indicates it is available to receive an address. The response can also indicate an address range for the device. The response can indicate additional information relating to the address, such as an address range or size (e.g., number of bits) and the type of address it needs (e.g., I/O address, memory mapped I/O, or prefetchable memory address). The response can also include a device number for the device, a bus number for the bus that the device is connected to, and a bus slot number. For example, the device 190 response can indicate that it needs 0x100 bytes of PCI Memory address space. Using the response, CPU 105 can assign or allocate an address for the device 190a, which can be consecutive in view of other device addresses that are behind the same bridge. The address for device 190a can also be inconsecutive in view of other device addresses. In one implementation, the CPU 105 can group the type of access of the device (e.g., memory, I/O) with other accesses of the same type, and assign memory and I/O addresses to the detected devices. The CPU can identify a first address of the address range for the device in a message, such as in an initialization message, in a response to the device response to the initialization message, etc.

CPU 105 can use initialization probes, and responses to the initialization probes to identify devices 190 and buses 180 within the system, to build a system list of the system and to program addresses for device 190. The CPU 105 can, for example, identify the number of available slots on a bus 180 and identify devices connected to the slots. The system list can be updated to identify whether a slot is occupied, and if occupied, the system list can include the corresponding device or bus. CPU 105 can also initiate an initialization transaction by assigning an address for device 190 to enable an address register in the device.

If CPU 105 detects a bridge 185 during initialization, it can add the bridge 185 to the system list. The CPU 105 can then scan the bus on the other side of the bridge 185. When scanning bus 180a, for example, CPU 105 detects bridge 185a. CPU 105 can identify bus 180a as the primary bus for bridge 185a and can identify bus 180b as the secondary bus for bridge 185a. CPU 105 can also assign a temporary subordinate bus identifier for bridge 185a (e.g., 0xFF). The subordinate bus identifier remains temporary until CPU 105 finishes identifying all the devices, buses and bridges within system 100A. When another downstream bridge is discovered, the temporary subordinate bus identifier is updated to identify the newly discovered bridge. CPU 105 can continue to scan buses 180 for devices until no more bridges 185 are identified at which point the temporary subordinate bus identifier for each bus becomes permanent.

The systems and methods described herein can be performed in a virtual computing environment. Computing system 100B can include one or more virtual machines (VMs) running on top of a hypervisor. A VM is a portion of software that, when executed on appropriate hardware, creates an environment allowing the virtualization of a physical computing system. The software layer providing the virtualization is commonly referred to as a hypervisor and is also known as a virtual machine monitor (VMM), a kernel-based hypervisor, or a host operating system. Virtualization permits multiplexing of an underlying host computer between different VMs. The host computer allocates a certain amount of its physical resources (e.g., components, devices) to each of the VMs. Each VM is then able to use the allocated resources to execute applications, including operating systems (referred to as guest operating systems (OS)). The hypervisor emulates the underlying hardware of the host computer, making the use of the VM transparent to the guest operating system and the user of the computer. A VM may have a virtual processor, virtual system memory, virtual storage, virtual buses, virtual bridges, and various virtual devices. A VM can be initialized in a similar manner as described herein and addresses for virtual devices can be assigned or allocated as described herein with respect to physical devices.

The hypervisor can execute commands using a virtual CPU (vCPU). When initializing devices of a virtual machine, addresses for each virtual device are allocated and recorded in a system register, as described herein. For virtual devices that are associated with underlying physical devices, the hypervisor can create a translation table that translates addresses of virtual devices available to the guest operating system to addresses for the physical devices on the host. If the hypervisor executes a memory access instruction for a physical device available to the guest OS, the hypervisor can use the translation table to translate the request for the virtual device to an address for the physical device. In the virtual computing environment, bridge 185 may represent a virtual bridge that is part of the hypervisor.

Figure 2:
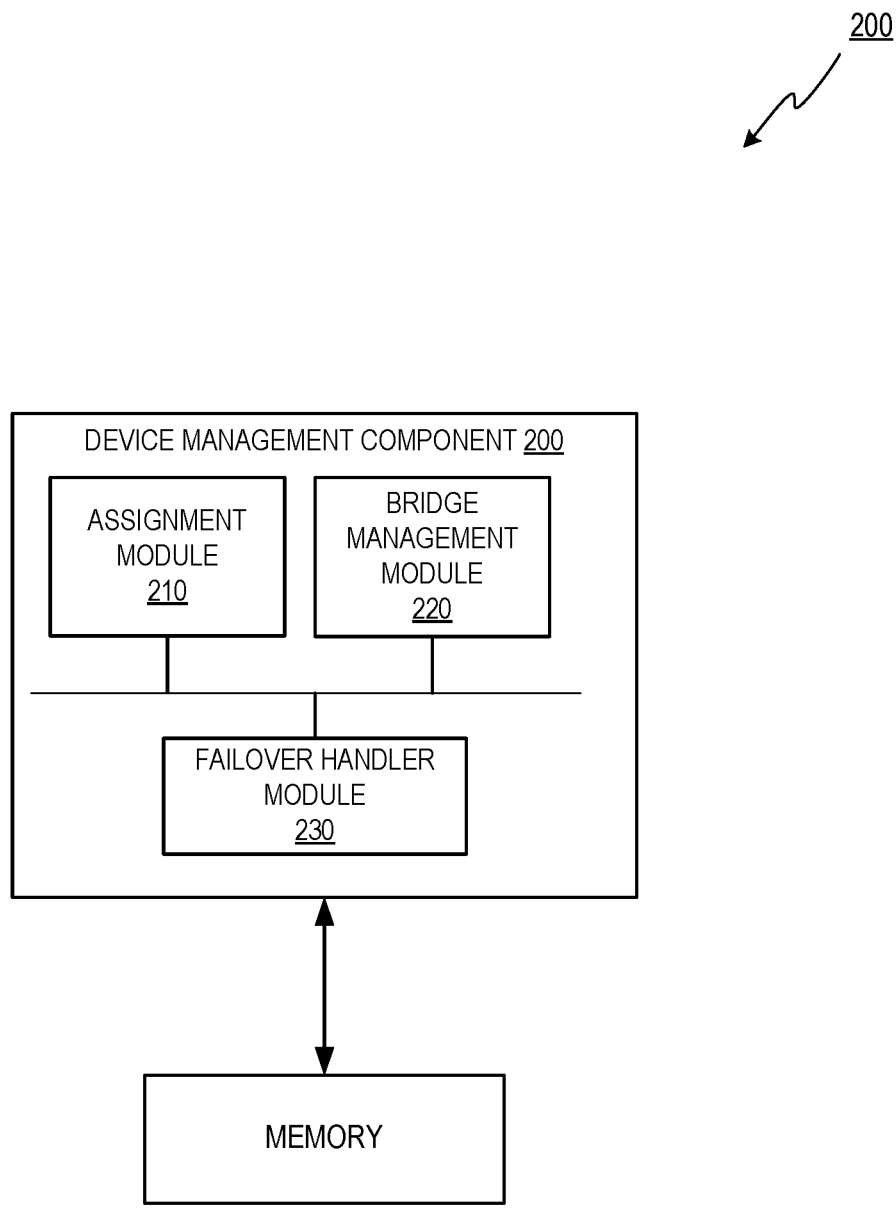
FIG. 2 is a block diagram of a detailed view of a computer system implementing a device management component according to an implementation of the disclosure.

FIG. 2 depicts a block diagram illustrating an example device management component 200 in accordance with some implementations of the disclosure. The device management component of FIG. 2 may be same as the device management component 137 of FIG. 1. As illustrated, the device management component 200 may include an assignment module 210, a bridge management module 220 and a failover handler module 230. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The assignment module 210 may assign one or more devices to a virtual machine. For example, the assignment module 210 may assign a passthrough device to the virtual machine. As another example, the assignment module 210 may assign an emulated device to the virtual machine.

The bridge management module 220 may manage one or more bridge devices for a hypervisor, such as one or more bridges 185 of FIG. 1B. For example, the bridge management module 220 can associate bridge devices attached to related devices (e.g., a passthrough device and an emulated device in a failover relationship) with the same hypervisor data to indicate that the bridge devices are attached to the related devices. In some embodiments, the bridge management module 220 may identify a first bridge device and a second bridge that are associated with a primary device and a failover device, respectively. The bridge management module 220 can associate the first and the second bridge devices with the same hypervisor data to indicate that the first and the second bridge devices are associated with a pair of devices in a failover relationship.

The failover handler module 230 may detect and/or handle failover events for the hypervisor. As referred to herein, a failover event may be any event that may indicate and/or trigger a virtual machine from using a first device to a second device (e.g., from a primary device to a failover device, from the failover device to the primary device, etc.). The first device and the second device may provide the same type of function (e.g., storage controller, network controller, input device, etc.). For example, the first device and the second device may be a passthrough device and an emulated device, respectively. The failover event may correspond to a request to migrate the virtual machine, an indication that the first device is not available, a request for resource overcommit, etc.

In some embodiments, upon detecting a failover event related to the first device, the failover handler module 230 may cause the virtual machine to switch from the first device to the second device. For example, the failover handler module 230 may identify the second device as a failover device of the first device. To identify the second device, the failover handler module 230 can determine that the first device is attached to a first bridge device (e.g., a first PCI bridge) and that the first device can provide a first type of function (e.g., storage controller, network controller, input device, etc.). The failover handler module 230 may further determine that the first bridge device is associated with the hypervisor data and identify a second bridge device associated with the hypervisor data. The failover handler module 230 may then identify a device attached to the second bridge device as the second device (e.g., the failover device of the first device). To identify the second device, the failover handler module 230 may identify one or more devices attached to the second bridge device and may determine respective functions of the identified devices (e.g., in view of configuration spaces of the identified devices). The failover handler module 230 may select, from the devices attached to the second bridge device, a device that can provide the first type of function as the second device. The failover handler module 230 can provide information about the second device to the assignment module 210. The assignment module 210 can then assign the second device to the virtual machine upon receiving the information about the second device.

Figure 3:
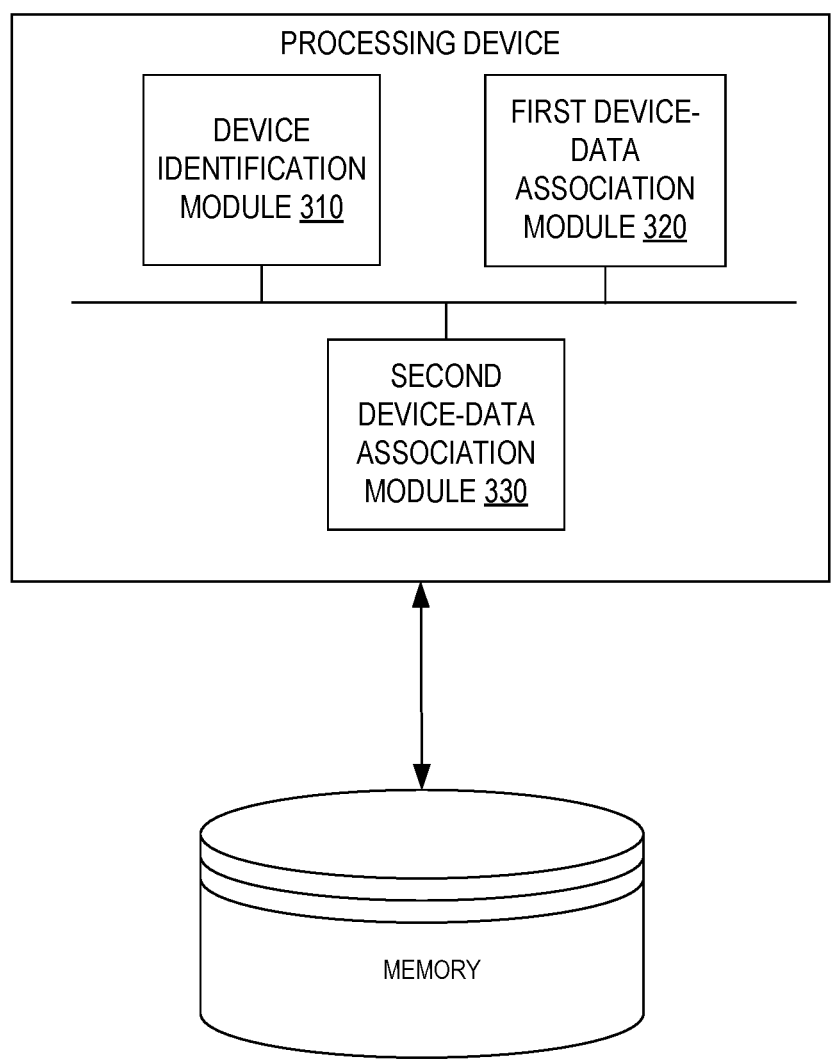
FIGS. 3, 4, and 5 depict block diagrams of example computer systems operating in accordance with one or more aspects of the present disclosure.
Figure 4:
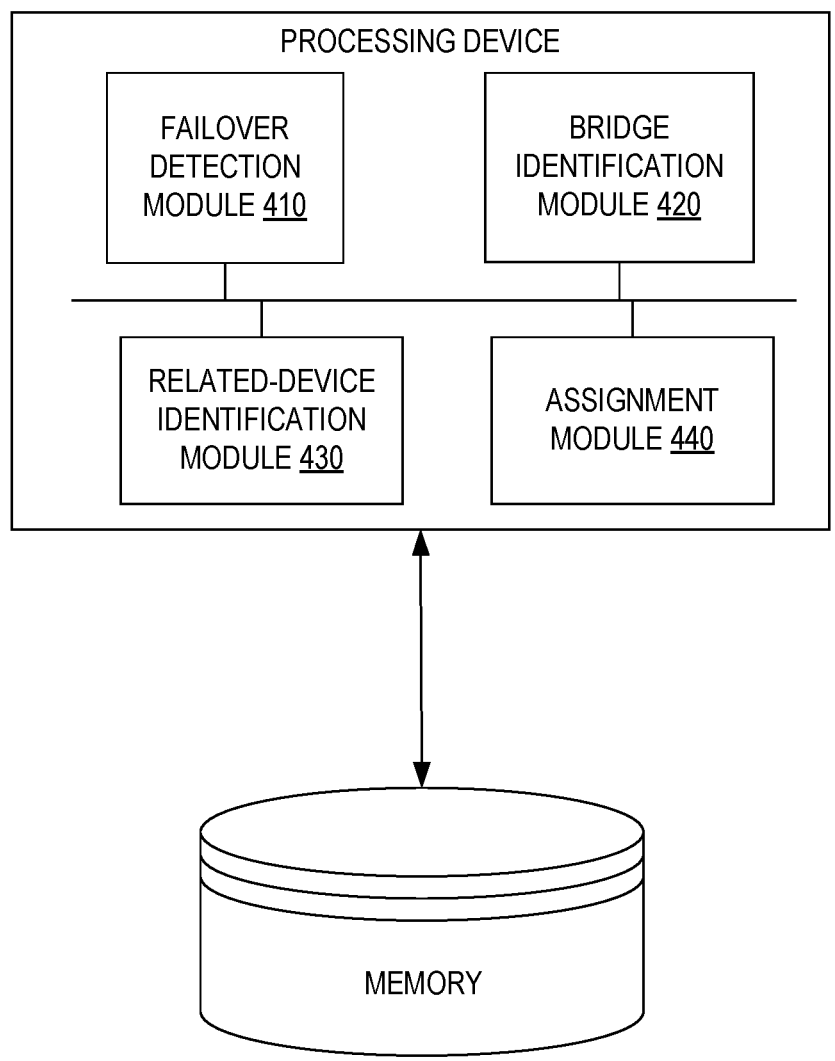
Figure 5:
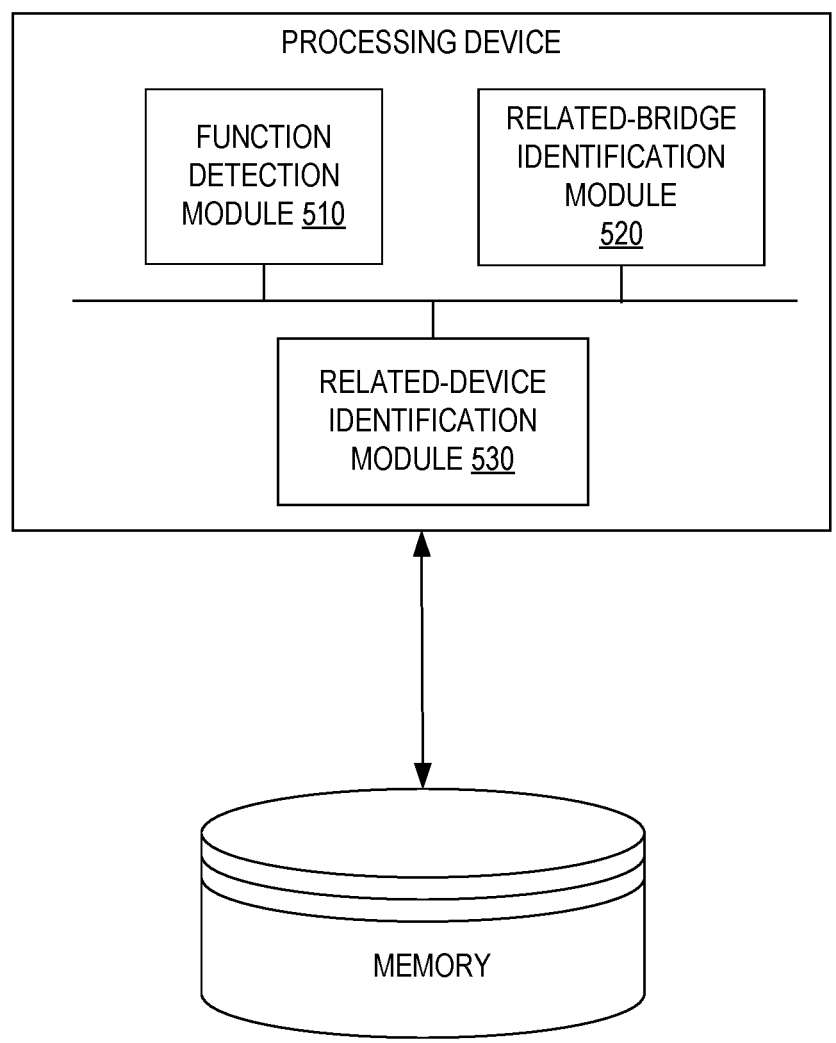

FIGS. 3, 4, and 5 depict block diagrams of example computer systems operating in accordance with one or more aspects of the present disclosure. Each of computer systems 300, 400, and 500 may be the same or similar to computer system 100A and may include one or more processing devices and one or more memory devices. Each of computer systems 300, 400, and 500 may further include a memory storing data in accordance with the present disclosure.

Referring to FIG. 3, computer system 300 may include a device identification module 310, a first device-data association module 320, and a second device-data association module 330.

The device identification module 310 may identify one or more devices to be assigned to a virtual machine. For example, the device identification module 310 can identify a first device and a second device that are in a failover relationship. More particularly, for example, the first device may be a primary device to be used by the virtual machine to perform certain operations. The second device may be a failover device of the first device and may be used to perform the operations for the virtual machine when the primary device is not available and/or upon detection of a predetermined event (e.g., a failover event). In some embodiments, the first device may be a passthrough device. The second device may be a paravirtualized device.

The first device-data association module 320 may associate device data to the first device. The device data may be and/or include hypervisor data associated with a hypervisor executed by the processing device, such as a serial number, a device identifier, a vendor identifier, etc. In some embodiments, the hypervisor data may be specific to the hypervisor. To associate the hypervisor data with the first device, the first device-data association module 320 may associate the hypervisor data with a first bridge device and may attach the first device to the first bridge device. The first bridge device may be, for example, a first PCI bridge. The first bridge data association module 310 can associate the hypervisor data with the first bridge device by setting values of one or more registers of the first bridge device to values corresponding to the hypervisor data The second device-data association module 330 can associate the hypervisor data with the second device. For example, the second device-data association module 330 may configure one or more registers of the second device in view of the hypervisor data (e.g., by setting values of the registers to correspond to values of the hypervisor data). As another example, the second device-data association module 330 may associate a second bridge device with the hypervisor data and may attach the second device to the second bridge device.

As such, the association of the first device and the second device with the same hypervisor data may indicate that the first device and the bridge device are related devices (e.g., devices that are in a failover relationship).

Referring to FIG. 4, computer system 400 may include a failover detection module 410, a bridge identification module 420, a related-device identification module 430, and an assignment module 440.

The failover detection module 410 may detect failover events related to a virtual machine. The failover event may be any event that may indicate and/or trigger the virtual machine to switch from a first device to a second device. In some embodiments, the second device may be a failover device of the first device. The failover event may include, for example, an error and/or operation failure related to the first device, a request to migrate the virtual machine, etc.

The bridge identification module 420 can identify bridge devices in response to the detection of a failover event by the failover detection module 410. For example, in view of the detection of a failover event related to the first device, the bridge identification module 420 can determine that the first device is attached to a first bridge device (e.g., a first PCI bridge) and/or that the first bridge device is associated with hypervisor data. The bridge identification module 420 can then identify a second bridge device that is also associated with the hypervisor data. In some embodiments, the processing device can determine that the second bridge device is associated with the hypervisor data in response to determining that the values of one or more registers associated with the second bridge device (e.g., a configuration space of the bridge device) correspond to the hypervisor data.

The related-device identification module 430 can identify one or more devices related to the first device in view of the identification of the second bridge. For example, the related-device identification module 430 may identify functions provided by the first device and may determine a first type of function provided by the first device (e.g., in view of the configuration space of the first device). The processing device may identify one or more devices attached to the second bridge device and may determine respective functions of the identified devices (e.g., in view of configuration spaces of the identified devices). The related-device identification module 430 may select, from the devices attached to the second bridge device, a device that can provide the first type of function as a second device related to the first device.

The assignment module 440 can assign the second device to the virtual machine. For example, the assignment module 440 can activate a driver associated with the second device. The assignment module 440 can then expose the second device to a guest operating system of the virtual machine. In some embodiments, the assignment module 440 may also detach the first device from the virtual machine in response to detecting the failover event and/or upon assigning the second device to the virtual machine. For example, the assignment module 440 can update a data structure, such as a page table or an internal hypervisor data structure, with instructions to forward requests intended for the passthrough device to the second device.

Referring to FIG. 5, computer system 500 may include a function detection module 510, a related-bridge identification module 520, and a related-device identification module 530.

The function detection module 510 can determine functions and/or types of functions of devices that may be assigned to a virtual machine. For example, the function detection module 510 can determine a type of function of a first device by accessing one or more registers of the first device (e.g., the configuration space of the first device) to obtain data about the type of function of the first device. Examples of the type of function include storage controller, network controller, input device, etc. In some embodiments, the function detection module 510 can obtain values of a register of the first device that indicate the type of function that the first device performs (e.g., values of the "class code" fields of a PCI configuration space) and determine the type of function of the first device in view of the values. In some embodiments, the function detection module 510 may determine one or more functions that can be performed by the first device in view of values of one or more registers of the first device (e.g., values of the "class code" fields and/or the "subclass" field of a PCI configuration space).

The related-bridge identification module 520 can identify bridge devices attached to related devices. For example, the related-bridge identification module 520 can identify a second bridge device in view of hypervisor data associated with a first bridge device attached to the first device. For example, the related-bridge identification module 520 can select, from a plurality of bridge devices managed by a hypervisor, a bridge device associated with the hypervisor data as the second bridge device. In some embodiments, the related-bridge identification module 520 can determine that the second bridge device is associated with the hypervisor data in response to determining that the values of one or more registers associated with the second bridge device (e.g., a configuration space of the bridge device) correspond to the hypervisor data.

The related-device identification module 530 can identify related devices in view of data provided by the function detection module 510 and the related-bridge identification module 520. For example, the related-device identification module 530 can select, from a plurality of devices attached to the second bridge device, a second device in view of the type of function of the first device. In some embodiments, the related-device identification module 530 can determine respective functions and/or types of functions of the devices attached to the second bridge device. The related-device identification module 530 can then select a device that can provide the first type of function as the second device. To determine a respective function and/or type of function of a given device attached to the second bridge device, the processing device can access one or more registers of the given device that specify a respective type of function and/or function that can be performed by the respective device (e.g., the "class code" fields and/or the "subclass" field of a PCI configuration space). The related-device identification module 530 can determine the respective function and/or type of function of the given device in view of values of the one or more registers in some embodiments.

Figure 6:
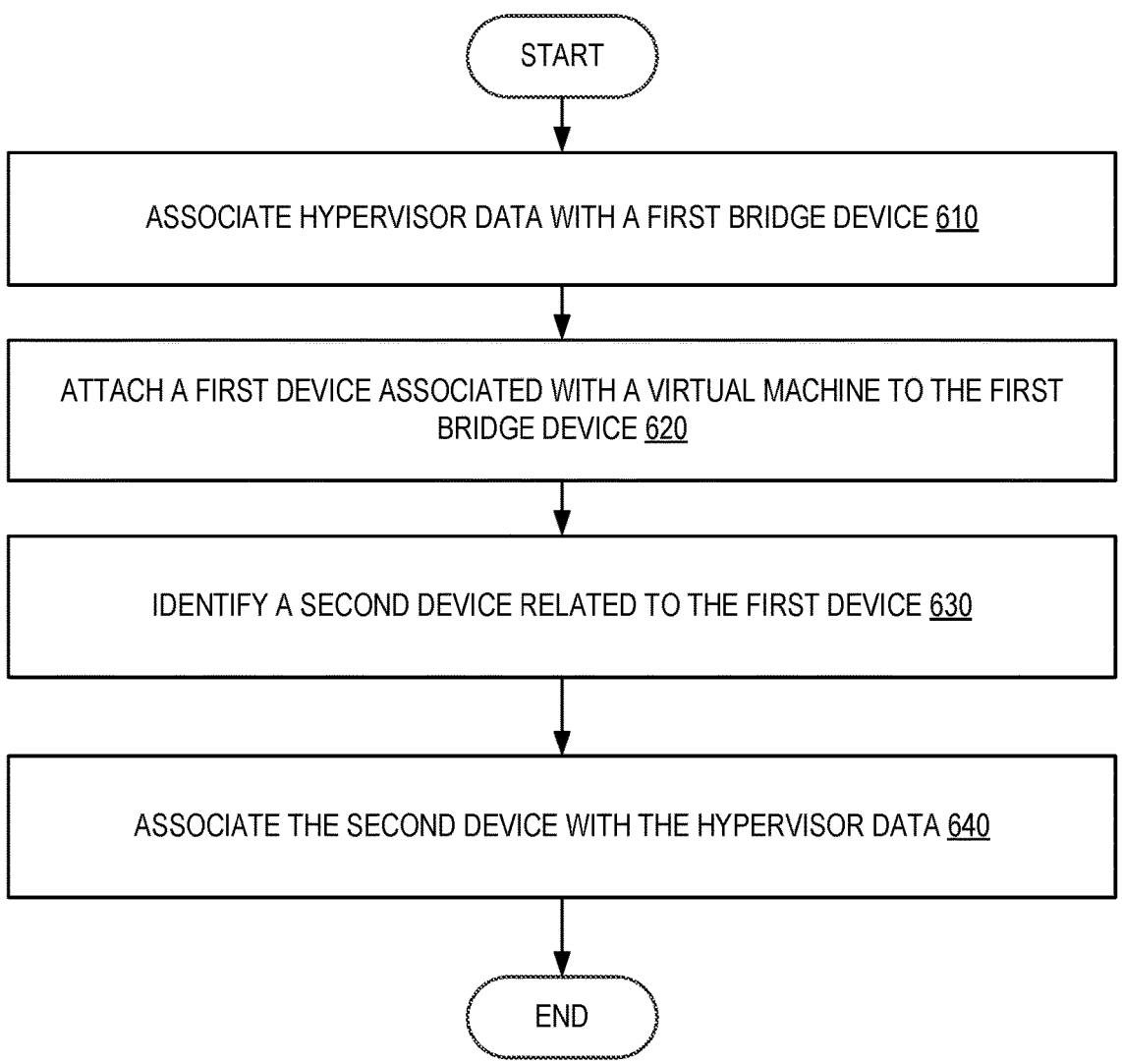
FIG. 6 is a flow diagram illustrating a method for associating related devices in a computer system in accordance with some embodiments of the present disclosure.
Figure 7:
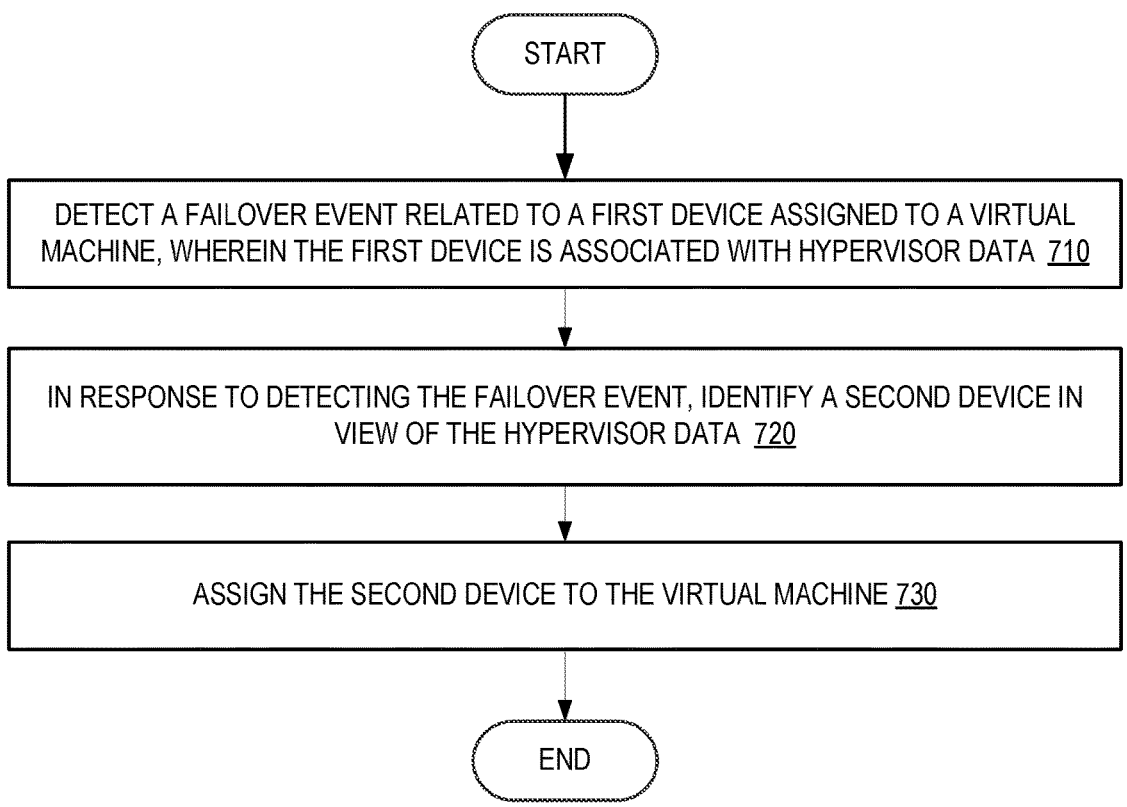
FIG. 7 is a flow diagram illustrating a method for handling a failover event in accordance with some embodiments of the present disclosure.
Figure 8:
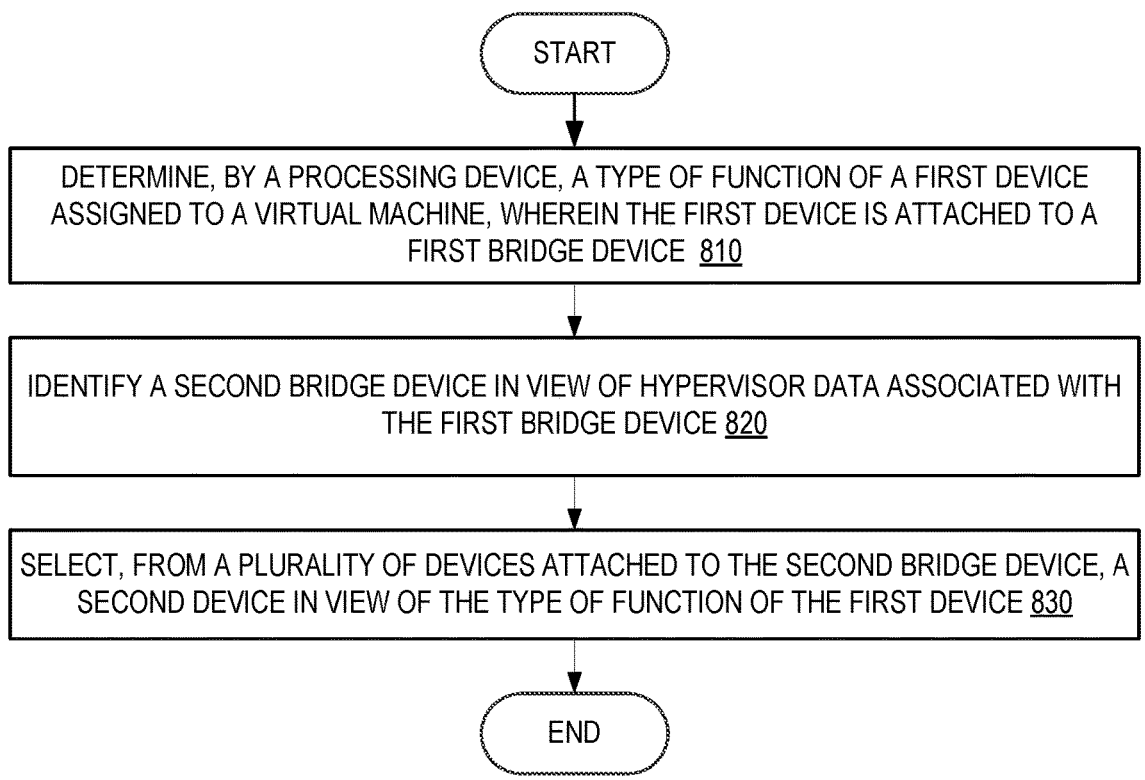
FIG. 8 is a flow diagram illustrating a method for identifying related devices in accordance with some embodiments of the present disclosure.

FIGS. 6, 7, and 8 are flow diagrams illustrating methods 600, 700, and 800 for memory management in a virtualized computer system in accordance with one or more aspects of the present disclosure. Method 600 illustrates an example process for associating related devices in accordance with some embodiments of the present disclosure. Method 700 illustrates an example process for handling a failover event in accordance with some embodiments of the present disclosure. Method 800 illustrates an example process for identifying a device related to a first device in accordance with some embodiments of the present disclosure. Methods 600, 700, and 800 may be performed by processing devices that may comprise hardware (e.g., circuitry, dedicated logic, programmable logic, microcode, etc.), executable code (such as is run on a general-purpose computer system or a dedicated machine), or a combination of both. Methods 600, 700, and 800 and each of their individual functions, routines, subroutines, or operations may be performed by one or more processors of the computer device executing the method. In certain implementations, methods 600, 700, and 800 may each be performed by a single processing thread. Alternatively, methods 600, 700, and 800 may be performed by two or more processing threads, each thread executing one or more individual functions, routines, subroutines, or operations of the method. In an illustrative example, the processing threads implementing methods 600, 700, and 800 may be synchronized (e.g., using semaphores, critical sections, and/or other thread synchronization mechanisms). Alternatively, the processes implementing methods 600, 700, and 800 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 600, 700, and 800 may be performed by computer system 100 as shown in FIG. 1.

Referring to FIG. 6, method 600 begins at block 610 where the processing device may associate hypervisor data with a first bridge device. The hypervisor data may be data associated with a hypervisor executed by the processing device. In some embodiments, the hypervisor data may be specific to the hypervisor. The hypervisor data may include, for example, a serial number, a device identifier, a vendor identifier, and/or any other suitable data that may be used to identify a bridge device. The first bridge device may be, for example, a first PCI bridge. The processing device can associate the hypervisor data with the first bridge device by setting values of one or more registers of the first bridge device to values corresponding to the hypervisor data.

At block 620, the processing device can attach a first device associated with a virtual machine to the first bridge device. The first device may be a device that performs any suitable function as described herein. The first device may be a passthrough device to be assigned to the virtual machine in some embodiments.

At block 630, the processing device may identify a second device related to the first device. The second device may be, for example, a failover device of the first device and may be used to perform the operations for the virtual machine when the primary device is not available (e.g., when the primary device experiences an error) and/or upon detection of a predetermined event (e.g., a failover event). The second device may be an emulated device (e.g., a paravirtualized device) in some embodiments.

At block 640, the processing device can associate the hypervisor data with the second device. The second bridge device may be, for example, a second PCI bridge. The processing device can associate the hypervisor data with the second bridge device by setting values of one or more registers of the second bridge device to values corresponding to the hypervisor data.

Referring to FIG. 7, method 700 begins at block 710 where the processing device may detect a failover event related to a first device assigned to a virtual machine. The first device may be associated with hypervisor data related to a hypervisor. For example, the first device may be attached to a first bridge device (e.g., a first PCI bridge). The first bridge device may be associated with the hypervisor data (e.g., device data such as a serial number, a device identifier, a vendor identifier, etc.). The failover event may be any event that may indicate and/or trigger a virtual machine to switch from the first device to a second device. In some embodiments, the second device may be a failover device of the first device. The failover event may include, for example, an error and/or operation failure related to the first device, a request to migrate the virtual machine, etc.

At block 720, the processing device can identify a second device in view of the hypervisor data in response to detecting the failover event. For example, the processing device may identify the second device in view of the hypervisor data by determining that the second device is associated with the hypervisor data. In some embodiments, the processing device can determine that the second device is associated with the hypervisor data in response to determining that the values of one or more registers associated with the second device (e.g., a configuration space of the second device) correspond to the hypervisor data. In some embodiments, the processing device can determine that the second device is associated with the hypervisor data in response to determining that the second device is attached to a second bridge device and that the second bridge device is associated with the hypervisor data.

In some embodiments, to identify the second device, the processing device may identify functions provided by the first device and may determine a first type of function provided by the first device (e.g., in view of the configuration space of the first device). The processing device may identify one or more devices attached to the second bridge device and may determine respective functions of the identified devices (e.g., in view of configuration spaces of the identified devices). The processing device may select, from the devices attached to the second bridge device, a device that can provide the first type of function as the second device. In one implementation, the processing device may determine a value of a first register of the first device indicative of the first type of function (also referred to as the "first value"). The processing device may identify the second device by determining that a value of a second register of the second device (also referred to as the "second value") matches the first value. In another implementation, the processing device may determine a value of a third register of the first device indicative of a function of the first device (also referred to as the "third value"). The processing device may identify the second device by determining that a value of a fourth register of the second device (also referred to as the "fourth value") matches the third value. In some embodiments, the processing device can identify the second device by performing one or more operations as described in connection with FIG. 8.

At block 730, the processing device can assign the second device to the virtual machine. For example, the processing device can activate a driver associated with the second device. The processing device can then expose the second device to a guest operating system of the virtual machine. In some embodiments, the processing device may also detach the first device from the virtual machine in response to detecting the failover event and/or upon assigning the second device to the virtual machine. For example, the processing device can update a data structure, such as a page table or an internal hypervisor data structure, with instructions to forward requests intended for the passthrough device to the second device.

Referring to FIG. 8, method 800 begins at block 810 where a processing device executing a hypervisor may determine a type of function of a first device assigned to a virtual machine. The first device may be attached to a first bridge device (e.g., a first PCI bridge). Examples of the type of function include storage controller, network controller, input device, etc. In some embodiments, to determine the type of function of the first device, the processing device can access one or more registers of the first device (e.g., the configuration space of the first device) to obtain data about the type of function of the first device. For example, the processing device can obtain values of a register of the first device that indicate the type of function that the first device performs (e.g., values of the "class code" fields of a PCI configuration space) and determine the type of function of the first device in view of the values. In some embodiments, the processing device may determine one or more functions that can be performed by the first device in view of values of one or more registers of the first device (e.g., values of the "class code" fields and/or the "subclass" field of a PCI configuration space). In some embodiments, the processing can determine a first value of a first register of the first device to determine the type of function of the first device.

At block 820, the processing device can identify a second bridge device in view of device data associated with the first bridge device. For example, the processing device can select, from a plurality of bridge devices managed by the hypervisor, a bridge device associated with the hypervisor data as the second bridge device. In some embodiments, the processing device can determine that the second bridge device is associated with the hypervisor data in response to determining that the values of one or more registers associated with the second bridge device (e.g., a configuration space of the bridge device) correspond to the hypervisor data.

At block 830, the processing device can select, from a plurality of devices attached to the second bridge device, a second device in view of the type of function of the first device. For example, the processing device can determine respective functions and/or types of functions of the devices attached to the second bridge device. The processing device can then select a device that can provide the first type of function as the second device. To determine a respective function and/or type of function of a given device attached to the second bridge device, the processing device can access one or more registers of the given device that specify a respective type of function and/or function that can be performed by the respective device (e.g., the "class code" fields and/or the "subclass" field of a PCI configuration space). The processing device can then determine the respective function and/or type of function of the given device in view of values of the one or more registers.

In some embodiments, selecting and/or identifying the second device may involve determine that values of one or more registers of the second device match the values of the registers of the first device indicative of the type of function and/or functions of the first device. For example, the processing device may select and/or identify the second device in response to determining that a value of a second register of the second device (the "second value") matches the first value. The second value may indicate a type of function of the second device. As another example, the processing device may determine a value of a third register of the first device (the "third value") that indicates a function of the first device. The processing device may select and/or identify the second device in response to determining that a value of a fourth register of the second device (the "fourth value") matches the third value.

Figure 9:
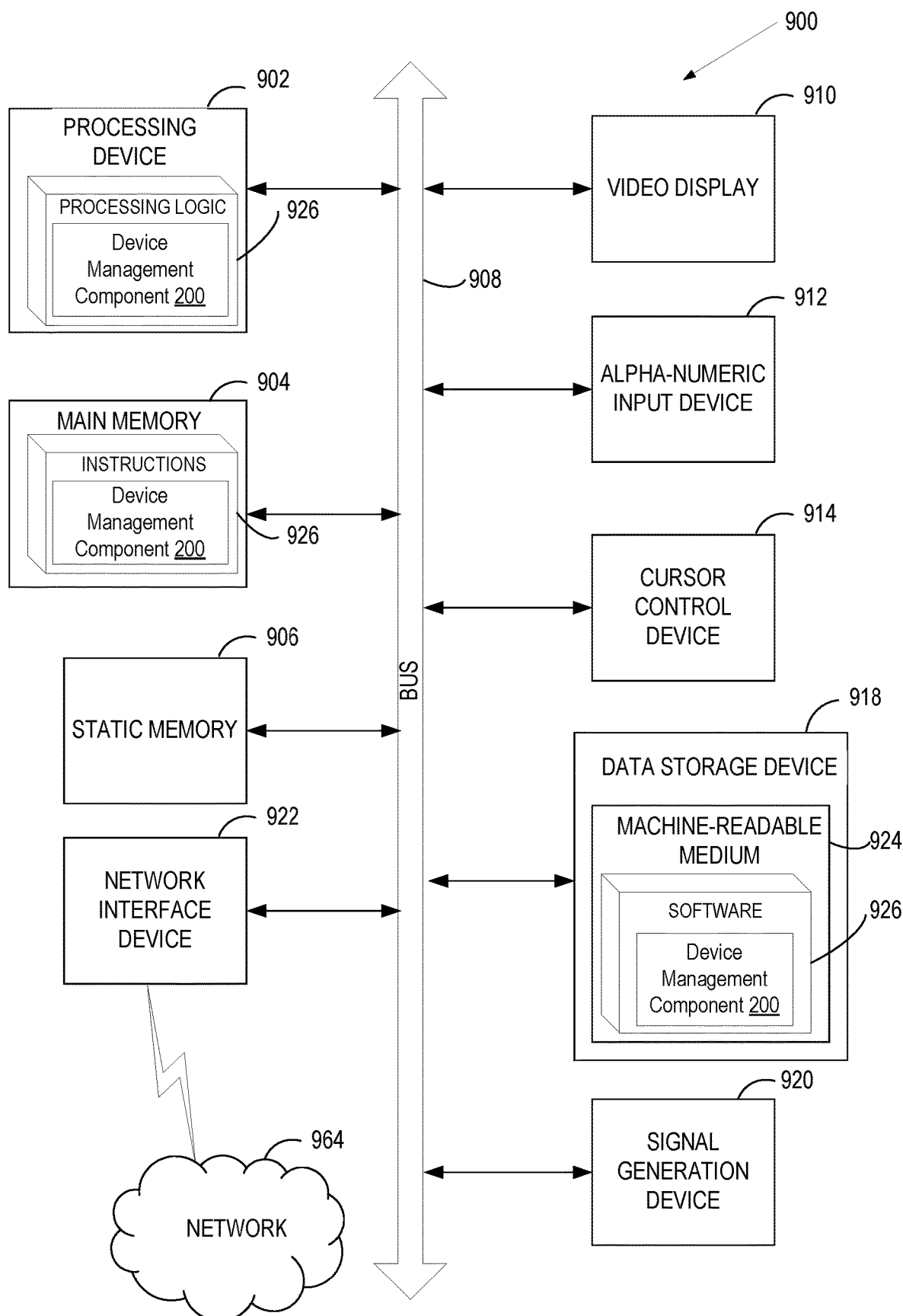
FIG. 9 illustrates a block diagram of one implementation of a computer system.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-readable storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 to manage devices for virtual machines, such as the scheduler component 137 as described with respect to FIGS. 1A-2, and/or a software library containing methods that call the above applications. While the machine-readable storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: associating, by a processing device executing a hypervisor, hypervisor data with a first bridge device; attaching a first device associated with a virtual machine to the first bridge device; identifying a second device related to the first device; and associating the second device with the hypervisor data.

Example 2 includes the subject matter of example 1, wherein the first device is a passthrough device, and wherein the second device is an emulated device.

Example 3 includes the subject matter of example 1, wherein associating the second device with the hypervisor data comprises: associating the hypervisor data with a second bridge device; and attaching the second device to the second bridge device.

Example 4 includes the subject matter of example 3, wherein the first bridge device is a first Peripheral Component Interconnect (PCI) bridge, and wherein the second bridge device is a second PCI bridge.

Example 5 includes the subject matter of example 3, further comprising: assigning the first device to the virtual machine; and in response to detecting a failover event, identifying the second bridge device in view of the hypervisor data.

Example 6 includes the subject matter of example 5, wherein assigning the first device to the virtual machine comprises granting a guest operating system of the virtual machine access to the first device.

Example 7 includes the subject matter of example 5, wherein assigning the second device to the virtual machine comprises: activating a second driver associated with the second device.

Example 8 includes the subject matter of example 5, wherein the failover event comprises at least one of a request to migrate the virtual machine, an indication that the first device is not available, or a request for resource overcommit.

Example 9 includes the subject matter of example 1, wherein the hypervisor data comprises at least one of a serial number or a device identifier.

Example 10 is a method comprising: detecting a failover event related to a first device assigned to a virtual machine, wherein the first device is attached to a first bridge device, and wherein the first bridge device is associated with hypervisor data related to a hypervisor; in response to detecting the failover event, identifying, by a processing device executing a hypervisor, a second device in view of the hypervisor data; and assigning, by the processing device, the second device to the virtual machine.

Example 11 includes the subject matter of example 10, further comprising detaching the first device from the virtual machine in response to detecting the failover event.

Example 12 includes the subject matter of example 10, wherein identifying the second device in view of the hypervisor data comprises: identifying a second bridge device associated with the hypervisor data; and determining that the second device is attached to the second bridge device.

Example 13 includes the subject matter of example 10, wherein identifying the second device comprises: determining a type of function of the first device; and determining that the second device performs the type of function.

Example 14 includes the subject matter of example 13, wherein determining the type of function of the first device comprises determining a first value of a first register of the first device indicative of the type function of the first device.

Example 15 includes the subject matter of example 14, wherein determining that the second device performs the type of function comprises: determining a second value of a second register of the second device; and determining that the second value matches the first value.

Example 16 includes the subject matter of example 10, wherein identifying the second device comprises: determining a function of the first device; and determining that the second device performs the function.

Example 17 includes the subject matter of example 16, wherein determining the function of the first device comprises determining a third value of a third register of the first device indicative of the function of the first device.

Example 18 includes the subject matter of example 17, wherein determining that the second device performs the function comprises: determining a fourth value of a fourth register of the second device; and determining that the fourth value matches the third value.

Example 19 includes the subject matter of example 10, wherein the failover event comprises at least one of a request to migrate the virtual machine, an indication that the first device is not available, or a request for resource overcommit.

Example 20 includes the subject matter of example 10, wherein assigning the second device to the virtual machine comprises: activating a driver associated with the second device.

Example 21 includes the subject matter of example 10, wherein the first bridge device is a PCI bridge Example 22 is a method comprising: determining, by a processing device executing a hypervisor, a type of function of a first device assigned to a virtual machine, wherein the first device is attached to a first bridge device; identifying a second bridge device in view of hypervisor data associated with the first bridge device; and selecting, from a plurality of devices attached to the second bridge device, a second device in view of the type of function of the first device.

Example 23 includes the subject matter of example 22, wherein identifying the second bridge device in view of device data associated with the first bridge device comprises determining that the second bridge device is associated with the hypervisor data.

Example 24 includes the subject matter of example 22, wherein selecting, from the plurality of devices attached to the second bridge device, the second device comprises determining that the second device performs the type of function of the first device.

Example 25 includes the subject matter of example 22, wherein determining the type of function of the first device assigned to the virtual machine comprises: determining a first value of a first register of the first device; and determining the type of function of the first device in view of the first value.

Example 26 includes the subject matter of example 22, wherein selecting, from the plurality of devices attached to the second bridge device, the second device comprises: determining a second value of a second register of the second device; and determining that the second value matches the first value.

Example 27 includes the subject matter of example 22, wherein the first device is a passthrough device, and wherein the second device is an emulated device.

Example 28 includes the subject matter of example 22, further comprising: assigning the second device to the virtual machine in response to detecting a failover event related to the first device.

Example 29 includes the subject matter of example 22, wherein the first bridge device is a first PCI bridge, and wherein the second bridge device is a second PCI bridge.

Example 30 is an apparatus comprising: a processing device; and a means for associating, by a processing device executing a hypervisor, hypervisor data with a first bridge device; a means for attaching a first device to the first bridge device; a means for associating the hypervisor data with a second bridge device in view of a determination that a second device is related to the first device; and a means for attaching the second device to the second bridge device.

Example 31 includes the subject matter of 20, further comprising the subject matter of any of examples 2-29.

Example 32 is a system comprising: a memory; and a processing device operatively coupled to the memory, the processing device to implement the subject matter of any of examples 1-29.

Example 33 is a non-transitory machine-readable storage medium including instructions that, when accessed by a processing device, cause the processing device to implement the subject matter of any of examples 1-29.

Unless specifically stated otherwise, terms such as "receiving," "invoking," "associating," "providing," "storing," "performing," "detecting," "initiating," "obtaining," "generating," "determining," "updating," "modifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600, 700, and 800 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   assigning, to a first bridge device by a processing device executing a hypervisor, hypervisor data comprising an identifier-of a particular device by causing a value corresponding to the hypervisor data to be stored in a register of the first bridge device;
   determining, by the processing device, that a passthrough device is attached to the first bridge device;
   in response to determining that the passthrough device is attached to the first bridge device, assigning, by the processing device, the hypervisor data to the passthrough device; and
   assigning, by the processing device, the hypervisor data to an emulated device to identify the passthrough device and the emulated device as being related devices by performing at least one of:
     attaching the emulated device to a second bridge device assigned with the hypervisor data; or
     causing the value corresponding to the hypervisor data to be stored in a register of the emulated device.

2. The method of claim 1, wherein the first bridge device is a first Peripheral Component Interconnect (PCI) bridge, and wherein the second bridge device is a second PCI bridge.

3. The method of claim 1, further comprising:
   assigning the passthrough device to a virtual machine;
   detecting a failover event related to the passthrough device; and
   in response to detecting the failover event related to the passthrough device, identifying the emulated device in view of the hypervisor data.

4. The method of claim 3, wherein assigning the passthrough device to the virtual machine comprises granting a guest operating system of the virtual machine access to the passthrough device.

5. The method of claim 3, further comprising:
in response to identifying the emulated device, assigning, by the processing device, the emulated device to the virtual machine;
wherein the passthrough device is associated with a first driver; and
wherein assigning the emulated device to the virtual machine comprises activating a second driver associated with the emulated device different from the first driver.

6. The method of claim 3, wherein the failover event comprises at least one of a request to migrate the virtual machine, an indication that the passthrough device is not available, or a request for resource overcommit.

7. The method of claim 1, wherein the hypervisor data further comprises at least one of a serial number or a vendor identifier.

8. A system comprising:
a memory; and
a processing device operatively coupled to the memory, the processing device to:
detect a failover event related to a passthrough device assigned to a virtual machine, wherein the passthrough device is assigned with hypervisor data comprising an identifier of a particular device by being attached to a first bridge device comprising a register storing a value corresponding to the hypervisor data;
in response to detecting the failover event, identify an emulated device related to the passthrough device by performing at least one of:
determining that the emulated device is attached to a second bridge device assigned with the hypervisor data; or
identifying that the emulated device comprises a register storing the value corresponding to the hypervisor data; and
assign, by the processing device, the emulated device to the virtual machine.

9. The system of claim 8, wherein the first bridge device is a first Peripheral Component Interconnect (PCI) bridge, and wherein the second bridge device is a second PCI bridge.

10. The system of claim 8, wherein the failover event comprises at least one of a request to migrate the virtual machine, an indication that the passthrough device is not available, or a request for resource overcommit.

11. The system of claim 8, wherein the passthrough device is associated with a first driver, and wherein, to assign the emulated device to the virtual machine, the processing device is further to activate a second driver associated with the emulated device different from the first driver.

12. A non-transitory machine-readable storage medium including instructions that, when accessed by a processing device, cause the processing device to:
determine that a passthrough device is attached to a first bridge device comprising a register storing a value corresponding to the hypervisor data, the hypervisor data comprising an identifier of a particular device;
in response to determining that the passthrough device is attached to the first bridge device, assign the hypervisor data to the passthrough device; and
assign the hypervisor data to an emulated device to identify the passthrough device and the emulated device as being related devices by performing at least one of:
attaching the emulated device to a second bridge device assigned with the hypervisor data; or
causing the value corresponding to the hypervisor data to be stored in a register of the emulated device.

13. The non-transitory machine-readable storage medium of claim 12, wherein the first bridge device is a first Peripheral Component Interconnect (PCI) bridge, and wherein the second bridge device is a second PCI bridge.

14. The non-transitory machine-readable storage medium of claim 12, wherein the processing device is further to:
assign the passthrough device to a virtual machine;
detect a failover event related to the passthrough device; and
in response to detecting the failover event related to the passthrough device, identify the emulated device in view of the hypervisor data, and assign the emulated device to the virtual machine.

15. The system of claim 8, wherein the hypervisor data further comprises at least one of a serial number or a vendor identifier.

16. The non-transitory machine-readable storage medium of claim 12, wherein the hypervisor data further comprises at least one of a serial number or a vendor identifier.

17. The non-transitory machine-readable storage medium of claim 14, wherein the failover event comprises at least one of a request to migrate the virtual machine, an indication that the passthrough device is not available, or a request for resource overcommit.

18. The non-transitory machine-readable storage medium of claim 14, wherein the passthrough device is associated with a first driver, and wherein, to assign the emulated device to the virtual machine, the processing device is further to activate a second driver associated with the emulated device different from the first driver.

* * * * *